United States Patent [19]

Perdue

[11] Patent Number: 4,620,285
[45] Date of Patent: Oct. 28, 1986

[54] SONAR RANGING/LIGHT DETECTION SYSTEM FOR USE IN A ROBOT

[75] Inventor: Terry A. Perdue, St. Joseph, Mich.

[73] Assignee: Heath Company, St. Joseph, Mich.

[21] Appl. No.: 603,471

[22] Filed: Apr. 24, 1984

[51] Int. Cl.$^4$ .................. G06F 15/50; G05D 1/00
[52] U.S. Cl. .................. 364/513; 180/167; 318/587; 364/424; 367/96; 901/1; 901/46; 901/47
[58] Field of Search ............. 364/513, 516, 478, 449, 364/456, 460, 461, 424; 180/167, 168, 169; 901/46, 47, 1, 24, 50; 367/87, 95, 96, 103, 118, 119, 121, 138, 909; 343/912; 350/484, 486; 73/620; 318/560, 567, 569, 580, 587, 685, 696

[56] References Cited

U.S. PATENT DOCUMENTS

| | | | |
|---|---|---|---|
| 3,351,897 | 11/1967 | Baron | 367/151 |
| 4,119,900 | 10/1978 | Kremnitz | 901/1 X |
| 4,137,777 | 2/1979 | Haverl et al. | 73/620 |
| 4,330,874 | 5/1982 | Sorwick | 367/103 |

OTHER PUBLICATIONS

Hollis—"Newt, A Mobile Cognitive Robot"—pp. 30–45.
Marce et al—"An Autonomous Computer-Controlled Vehicle"—Proceedings of 1st International Conf. on Automated Guided Vehicle Systems, pp. 112–113, 1981.

Primary Examiner—Joseph Ruggiero

[57] ABSTRACT

A sonar ranging/light detection system provides information regarding the surrounding environment to a robot. The sonar portion of the system includes an upper rotating detector which provides 360° coverage as well as a lower, fixed detector located on the front of the robot which provides sensory information in the direction of robot movement. A light detector similarly provides a 360° light sensing capability. The upper sonar and light detectors utilize a common rotating mirror driven by a stepper motor and include a slotted shaft encoder in combination with an optopair semiconductor detector. The shaft encoder provides angular information to a microcomputer controller which is also responsive to sonar ranging information in exercising control of the stepper motor. The transmitted sonar signal is comprised of a pulse train of four different frequencies to ensure that simultaneous echoes from more than one surface do not cancel each other out and provide false ranging information. As the time for echo return increases for greater distances, the gain of the sonar receiver is increased by the controller in anticipation of receipt of a weaker echo. The rotating detector is capable of continuous 360° rotation, sector scanning, or pointing in a designated direction in obtaining ranging information and employs a retro-torque damping technique to provide faster angular stabilization of the mirror prior to making range measurements. The upper and lower sonar detectors are utilized in an alternating manner in the various modes of operation.

26 Claims, 6 Drawing Figures

SONAR RANGING/LIGHT DETECTION SYSTEM FOR USE IN A ROBOT

SPECIFICATION

Background of the Invention

This system relates generally to multi-detector sensing systems and is particularly directed to a combination sonar and light detection system for use in a robot.

Most robots currently in use are of the stationary type which perform a repetitive function in accordance with programmed instructions. However, increasing numbers of mobile robots capable of moving to various locations in order to perform a variety of programmed tasks are becoming available. To date, these mobile robots are capable of performing only relatively simple operations. However, the performance of more complex tasks will become possible with advances in programming, increases in microcomputer controller memory capacity, and improvements in electromechanical manipulation devices.

In addition to their limited capacity for performing complex operations, the high cost of the typical mobile robot has also contributed to their limited acceptance and usage. One component which has substantially contributed to the relatively high cost of most mobile robots is the sensor system. In order to perform tasks in more than one location, a mobile robot must be capable of sensing its present location and of determining where to proceed to in order to perform a subsequent operation. To date, this has been accomplished by means of several sensors positioned at various locations on the robot to permit it to locate itself with respect to other objects in its immediate vicinity. These sensing devices are generally of the acoustical or optical type and the robot is typically provided with a complex combination of detectors. Each detector incorporated in the robot, of course, increases its cost. Therefore, in the design and operation of a mobile robot it is desirable to provide a maximum sensing capability with a minimum number of relatively simple, inexpensive sensors.

The present invention is intended to provide such a capability in a mobile robot by means of a single transmit/receive device capable of 360° coverage around the robot and which may simultaneously be used with sonar and optical detectors.

OBJECTS OF THE INVENTION

Accordingly, it is an object of the present invention to provide an improved sensor system for a mobile robot.

It is another object of the present invention to provide a multi-sensor system for a mobile robot capable of providing bearing and ranging information.

Yet another object of the present invention is to provide an omnidirectional sensing capability in a mobile robot using a single transmit/receive device.

A further object of the present invention is to provide a sensor system for a mobile robot capable of continuous 360° rotation, sector scan, and pointing to a designated direction.

A still further object of the present invention is to provide a dual mode sensor for a mobile robot capable of providing 360° coverage as well as information relating to the immediate path of travel of the robot.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
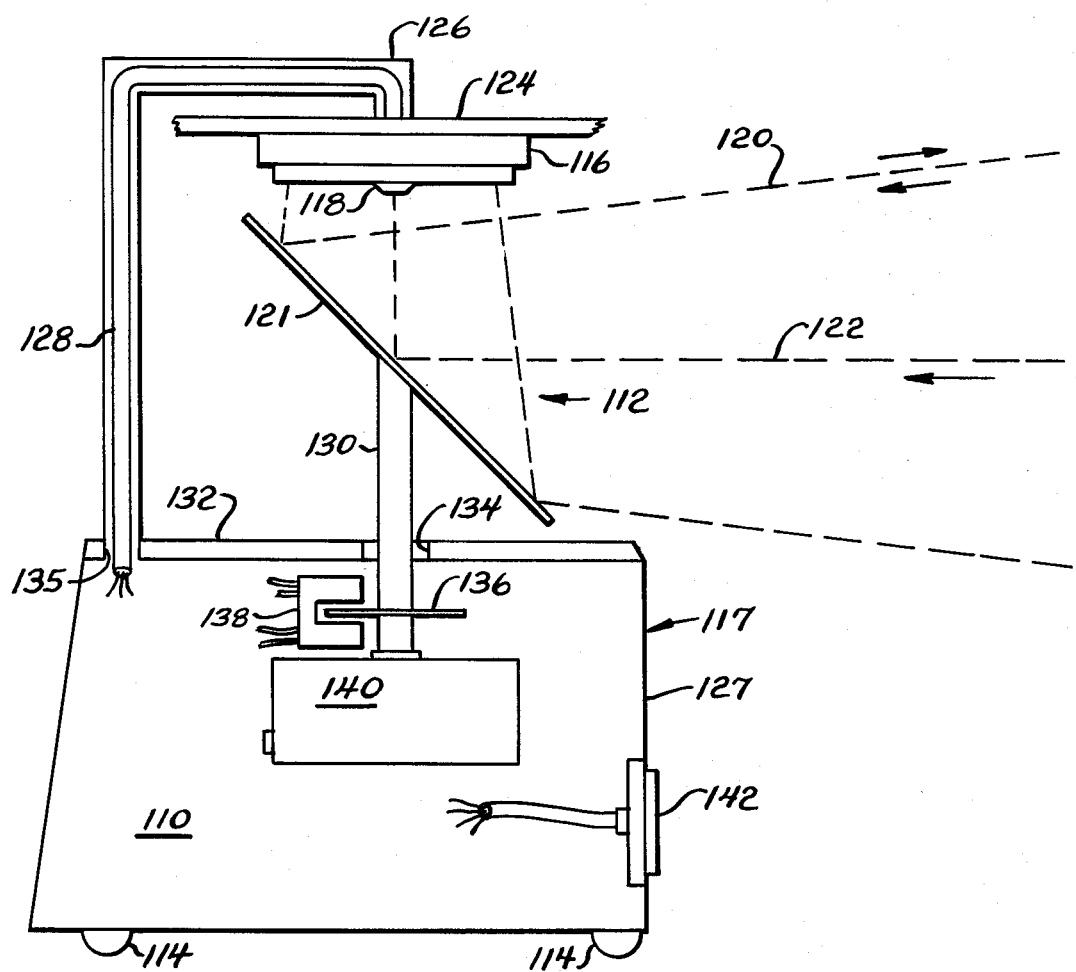
FIG. 1 is a simplified schematic diagram of a sonar ranging/light detection system for use in a mobile robot in accordance with the present invention.

Referring to FIG. 1, there is shown a simplified schematic diagram of a sonar ranging/light detection system 112 in accordance with a preferred embodiment of the present invention.

The sonar ranging/light detection system 112 is positioned in a mobile robot 110 which includes a housing 117. Rotationally coupled to a lower portion of housing 117 are a plurality of wheels 114 which permit the robot 110 to be displaced upon a support surface (not shown). Also provided within housing 117 are drive means (also not shown in the figure) coupled to wheels 114 for initiating the rotation thereof and the displacement of robot 110. Since the drive mechanism used to propel the robot 110 does not form a part of the present invention, it is not further discussed herein.

The robot housing includes an upper panel 132 which includes first and second apertures 134, 135 therein. Positioned within the first aperture 134 is a rotating support shaft 130 which is coupled to and rotationally displaced by a stepper motor 140. Also coupled to rotating support shaft 130 is a slotted disc 136. Positioned immediately adjacent slotted disc 136 is an optical switch 138. Optical switch 138 is capable of detecting the slot within slotted disc 136 and thus is responsive to rotation of the slotted disc 136 and support shaft 130. The present invention determines the angular position of slotted disc 136 and the orientation of support shaft 130 by detecting the slot in the disc and counting the number of angular displacement increments executed by stepper motor 140.

Mounted to an upper end portion of rotating support shaft 130 is a reflecting mirror 121. Positioned immediately above reflecting mirror 121 is an upper sonar transducer 116 which includes a light dependent resistor, or light sensor, 118 located at the center thereof. The combination of upper sonar transducer 116 and light dependent resistor 118 is coupled to a sensor support member 124 which is, in turn, coupled to and supported by a support bracket 126 at one end thereof. The other end of support bracket 126 is securely mounted to the upper panel 132 of the robot housing 117 immediately adjacent to and continuous with a second aperture 135 in upper panel 132. Positioned within support bracket 126 and extending from the combination of upper sonar transducer 116 and light dependent resistor 118 is a sensor lead 128 which extends into the robot housing 117 at the second aperture 135. Reflecting mirror 121 is oriented relative to the upper sonar transducer 116 and light dependent resistor 118 such that acoustic signals 120 and optical signals 122 incident upon mirror 121 are reflected up into the combination of sonar transducer 116 and light dependent resistor 118. Similarly, the inclined angle of reflecting mirror 121 causes acoustic signals 120 emanating from the upper sonar transducer 116 to be propagated in a generally horizontal direction within a beam width determined by the dimensions of the upper sonar transducer 16 and reflecting mirror 121. Support shaft 130 and reflecting mirror 121 secured to the upper end thereof are free to rotate in unison over 360° about a vertical axis through the robot housing 117.

Positioned upon a forward panel 127 of robot housing 117 is a lower sonar transducer 142. The upper and lower sonar transducers 116, 142 are capable of being driven in a vibrating manner so as to produce acoustic waves emanating therefrom. Similarly, each sonar transducer is responsive to received sonar echoes produced from the thus transmitted acoustic signals. In this manner, accurate ranging information from the robot 110 to objects in its surrounding environment may be derived. With the upper sonar transducer 116 operating in conjunction with rotating reflecting mirror 121, a full 360° sonar detection capability is provided, while the lower sonar transducer 142 provides for the detection of low objects positioned in the path of travel of the robot. Light dependent resistor 118, which also operates in conjunction with rotating reflecting mirror 121, permits the robot to detect a predetermined light level in its vicinity and to determine the angular position of that light source relative to a predetermined bearing, e.g., straight ahead. The manner in which the sonar ranging/light detection system 112 of the present invention is able to perform these functions is described in detail in the following paragraphs.

Figure 2:
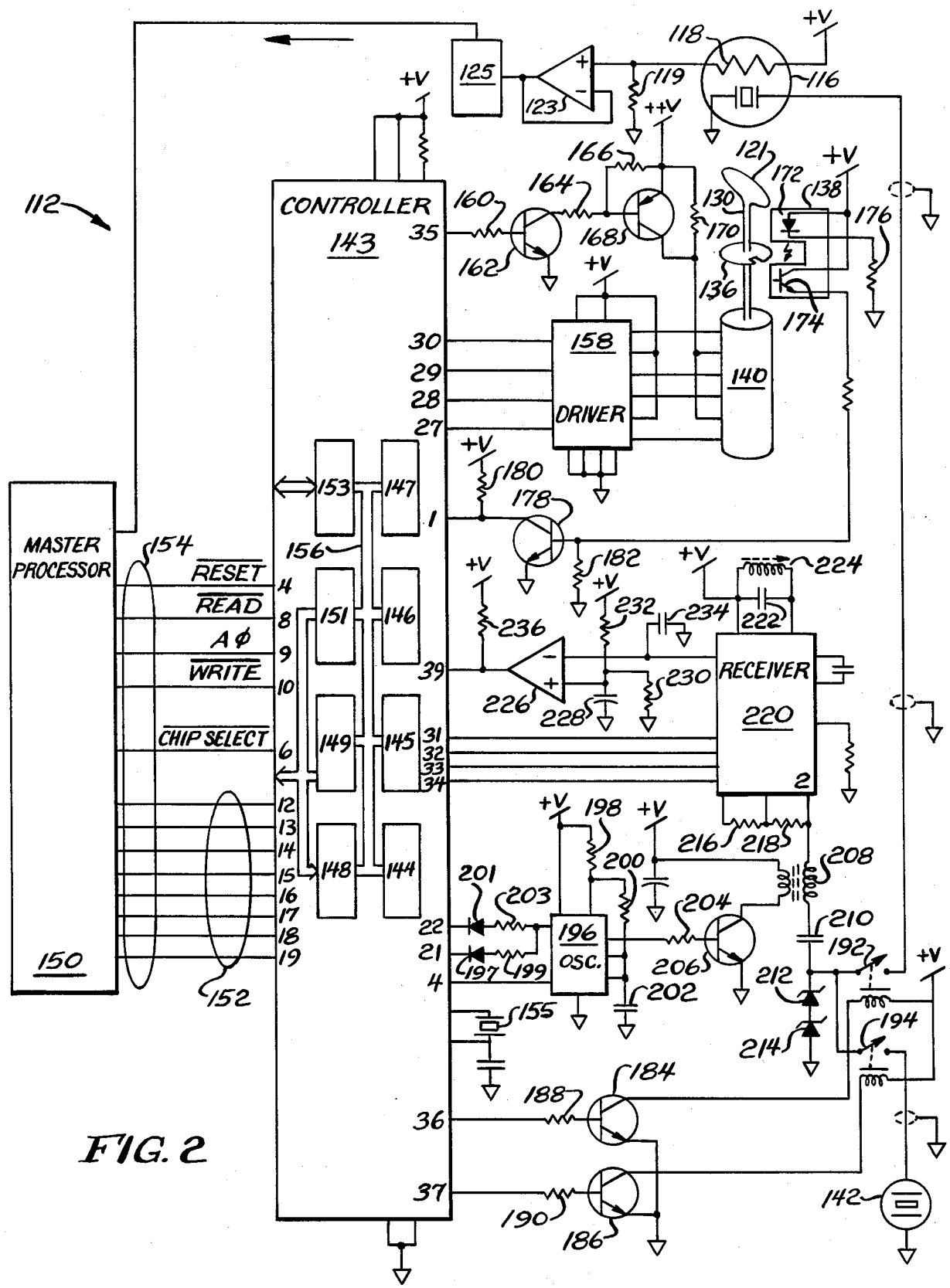
FIG. 2 is a circuit diagram in combined block and schematic form of a sonar ranging/light detection system for use in the robot of FIG. 1 in accordance with the presnt invention.

Referring to FIG. 2, there is shown a combined schematic and block diagram of a sonar ranging/light detection system 112 in accordance with a preferred embodiment of the present invention. The system includes a controller in the form of a microcomputer 143. The Intel 8041 Universal Peripheral Interface (UPI) microcomputer is used in a preferred embodiment. The controller 143 is coupled to a master processor 150 by means of a system bus 154 which includes a data bus 152. Data and commands may be exchanged between the master processor 115 and the controller 143 by means of the various connections therebetween. For example, user inputs provided to the master processor 150 may be used to direct the operation of the sonar ranging and light detection system 112 under the control of controller 143. The various inputs provided from the master processor 150 to the controller 143 include $\overline{\text{RESET}}$, $\overline{\text{READ}}$, A0 (Command Data Select), $\overline{\text{WRITE}}$, and $\overline{\text{CHIP SELECT}}$ lines. An 8-bit, bidirectional data bus 152 is capable of providing data from controller 143 to the master processor 150 and vice versa.

Controller 143 is conventional in design and use and includes a number of typical microcomputer components such as a central processing unit (CPU) 144, a program memory 145, a data memory 146, a timer/counter 147, a data bus input register 148, a data bus output register 149, a status register 151, and input/output lines 153. Controller timing is provided by means of an external crystal oscillator 155, with the controller 143 coupled to and energized by a +V input.

The controller's CPU 144 performs basic data manipulations and controls data flow throughout the controller via an internal 8-bit data bus 156. The program memory 145 is in the form of a read only memory (ROM) for program storage and is capable of storing 1024 8-bit words in a plurality of memory locations which are directly addressable by a 10-bit counter. The data memory 146 has 64 8-bit words of random access memory (RAM) data and contains two working register banks, an 8-level program counter stack and a scratchpad memory. The timer/counter 147 is an 8-bit register which may be programmed to divide the time base, controlled by crystal 155, by a selectable divisor. When the terminal count is reached, an interrupt occurs. This allows controller 143 to accurately measure time intervals. Data bus input and output registers 148, 149 are respectively used to receive data from and provide data to the master processor 150 via data bus 152. The aforementioned input/output (I/O) lines in the system bus 154 include 16 lines for input and output functions which are grouped as two 8-bit TTL compatible ports under software control. An 8-bit status register 151 is capable of communicating status information between the master processor 150 and controller 143.

Reflecting mirror 121 is positioned on an upper end portion of rotating support shaft 130. Located at an intermediate portion of rotating support shaft 130 is a slotted disc 136 which, in turn, is inserted within a slotted optical switch 138. Optical switch 138 includes a light emitting diode (LED) 172 coupled to a +V source and to neutral ground potential via resistor 176. LED 172 is optically coupled to a phototransistor 174 within the optical switch 138. Positioning of the slot in disc 136 between the LED 172 and phototransistor 174 permits light to be received by phototransistor 174 which is rendered conductive thereby. The output of phototransistor 174 is provided to the base of NPN transistor 178 which is thereby turned on pulling the input to pin 1 of controller 143 low. When the stepper motor 140 which drives rotating support shaft 130 is at 0° (straight ahead relative to robot 110), the slot in disc 136 is positioned within the optical switch 138 causing a low input to be provided to pin 1 of controller 143. Whenever controller 143 determines that the stepper motor 140 should be at 0°, or straight ahead, it checks pin 1 which is its TEST 0 input in order to verify the rotational position of stepper motor 140. If the input to pin 1 is high, controller 143 rotates stepper motor 140 until the input goes low, clears its distance registers of what is likely to be erroneous data, and resumes its normal operation. The collector of NPN transistor 178 is coupled via resistor 180 to a +V input, while its base is coupled to neutral ground potential via resistor 182.

Stepper motor 140 is conventional in design and includes four windings (not shown) which are energized in a predetermined sequence to cause it to rotate. Stepper motor 140 is energized by a driver circuit 158, which in a preferred embodiment is a DS3658 Quad High Current Peripheral Driver integrated circuit available from National Semiconductor Corporation of Santa Clara, Calif. Driver circuit 158 converts the TTL levels of controller 143 to the voltage used by stepper motor 140 and is capable of handling the required current as well as the voltage spikes produced when a winding in stepper motor 140 is deenergized.

Pins 27, 28, 29 and 30 of controller 143 provide four phase signals to the respective four windings of stepper motor 140 via driver circuit 158. Driver circuit 158 is energized by a +V input. To conserve power, NPN transistor 162 and PNP transistor 168 provide a means of reducing current to the motor windings of stepper motor 140 to a level sufficient to keep it from rotating due to bumps and vibrations encountered when the robot 110 is in motion. NPN transistor 162 is normally on when stepping the motor 140 in applying a full ++V (12 VDC) voltage to its windings. After stepper motor 140 has been damped as described in the following paragraph, PNP transistor 168 turns off with a holding current then provided to stepper motor 140 from the ++V input via resistor 170 coupled across the emitter and collector of PNP transistor 168. PNP transistor 168 turns off after each incremental displacement of stepper motor 140, with the aforementioned holding current provided to stepper motor 140 after the turnoff of PNP transistor 168.

After the appropriate windings of stepper motor 140 are energized in a particular sequence to cause the rotation thereof, stepper motor 140 and its load, i.e., rotating support shaft 130, slotted disc 136, and reflecting mirror 121, must be allowed to settle before the upper sonar transducer 116 is actuated. This is accomplished by means of retro-torque damping of stepper motor 140 as provided by controller 143 in the following manner. Controller 143 provides a retro-torque damping code to stepper motor 140 via driver circuit 158 in rotating the stepper motor 140 15°, back-stepping stepper motor 140 by 7½°, and returning to the desired bearing. The delays preceding and following the 7½° back-step are adjusted to minimize rotational bounce. These delays are dependent primarily upon the rotational characteristics of stepper motor 140, the amount of mass associated with rotating support shaft 130, and the ++V voltage applied to the stepper motor 140. The aforementioned delays are based upon the components used in the stepper motor drive mechanism and drive circuit and may be fine-tuned using software commands within controller 143 if any hardware modifications or changes are made. Resistors 160, 164 and 166 perform voltage dividing and biasing functions with respect to transistors 162 and 168 in the stepper motor hold circuit.

The transmitted sonar pulses are generated by means of an astable oscillator 196. The basic operating frequency of astable oscillator 196 is determined by resistors 198 and 200 which are coupled to a +V input and by capacitor 202 which is coupled to neutral ground potential. In a preferred embodiment, a 555 timer circuit is utilized. Astable oscillator 196 is enabled by the pin 23 output of controller 143. A parallel arrangement of serially coupled diode 201, resistor 203 and diode 197, resistor 199 is connected between controller 143 and astable oscillator 196. By selectively switching in the various combinations of these diode and resistor series arrangements, the voltage on the control input under the control of controller 143 changes the reference voltage to the internal comparators (not shown) of astable oscillator 196 and causes its basic frequency to change slightly. Diodes 201 and 197 are thus used to selectively switch resistors 203 and 199 in circuit with astable oscillator 197. In a preferred embodiment, this diode switching arrangement in accordance with outputs from controller pins 21 and 22 permits astable oscillator 196 to sequentially generate a pulse train consisting of 6 cycles at 60 kHz, 6 cycles at 57 kHz, 12 cycles at 53 kHz, and 16 cycles at 50 kHz. It is in this manner that four different frequencies are sequentially output by astable oscillator 196. The use of these different frequencies to drive a sonar transducer prevents the cancelling out of reflected signals from surfaces spaced one-half wavelength apart.

This pulse train from astable oscillator 196 is provided via resistor 204 to the base of NPN transistor 206. NPN transistor 206, in turn, is coupled to a primary winding of transformer 208, a secondary winding of which is coupled via AC coupling capacitor 210 and relay 192 to the upper sonar transducer 116 for providing acoustic output signals thereto. Transformer 208 performs a voltage step-up function in providing approximately 300 volt pulses via capacitor 210 to the upper sonar transducer 116. The pulsed output of step-up transformer 208 may similarly be provided to a lower sonar transducer 142 as described below. The pulse amplitude of the signals provided to a sonar transducer is regulated by the grounded series combination of Zener diodes 212 and 214. The collector of NPN transistor 206 is coupled via the primary winding of step-up transformer 208 to a +V input.

A second relay 194 couples the lower sonar transducer 142 to step-up transformer 208. Relays 192 and 194 are of the reed type and are respectively coupled to and actuated by NPN transistors 184 and 186. A respective output provided from controller pins 36 and 37 via resistors 188 and 190 turns on either NPN transistor 194 or NPN transistor 186. With NPN transistor 184 turned on, relay 192 is engaged and the upper sonar transducer 116 is actuated. Similarly, with NPN transistor 186 turned on, relay 194 is actuated and the lower sonar transducer 142 is actuated. Relay driver transistors 184 and 186 are rendered conductive by outputs from controller 143 in accordance with its operating program or control signals provided thereto from the master processor 150 in response to user inputs. Transistors 184 and 186 are not rendered conductive simultaneously and therefore either the upper or lower sonar transducer will be selected at a given time. In a preferred embodiment, if reflecting mirror 121 is not rotating, relays 192 and 194 are alternately actuated and transducers 116 and 142 output sonar signals in an alternating manner. If the upper sonar transducer 116 is in a sector scan mode of operation, the upper sonar transducer 116 outputs pulses until an angular limit is reached whereupon the lower sonar transducer 142 emits a sonar pulse. If the upper sonar transducer 116 is in the rotating 360° mode of operation, the lower sonar transducer 142 emits a sonar pulse each time the upper sonar transducer 116 passes through 0° bearing (straight ahead).

A receiver circuit 220 is coupled between the secondary winding of transformer 208 and controller 143. Receiver circuit 220 is specifically designed to operate as a receiver with a Polaroid ultrasonic transducer which is used in a preferred embodiment of the present invention. Receiver 220 is a TL852CN integrated circuit available from Texas Instruments of Dallas, Tex.

At the end of a transmitted pulse train, astable oscillator 196 is disabled by an output from pin 23 of controller 143 to the control line of the astable oscillator. During the transmit mode of operation, pin 2 of receiver circuit 220 is grounded via circuitry within receiver 220. The system then waits for an echo. The initial gain of receiver circuit 220 is established by the values of resistors 216 and 218. A tank circuit comprised of the parallel arrangement of capacitor 222 and inductor 224 is tuned to resonate near the average pulse train frequency. A +V input is provided to the receiver circuit 220 via the aforementioned tank circuit. The gain of the receiver circuit 220 is digitally controllable over several orders of magnitude by means of a plurality of output control signals from pins 31, 32, 33 and 34 of controller 143. As the time-to-echo increases, controller 143 increases the gain of receiver circuit 220 in anticipation of a weaker acoustic echo. The received echo is provided via the upper or lower sonar transducer and associated relay, AC coupling capacitor 210, and the secondary winding of transformer 208 to receiver circuit 220. The detected echo is processed by the receiver circuit 220 resulting in a positive output pulse therefrom which is integrated by capacitor 234 and applied to the inverting input of comparator 226. The noninverting input of comparator 226 is maintained at 1.2 VDC by a voltage divider circuit comprised of resistors 230 and 232 coupled to a +V input. With a positive pulse exceeding 1.2 volts provided to the inverting input of comparator 226 from receiver circuit 220, the output of comparator 226 is a low-going TTL-compatible pulse which causes controller 143 to convert the elapsed time to distance and store it in its internal data memory (RAM) 146. Capacitors 228 and 234 filter out unwanted noise, while resistor 236 is a pull-up for the open collector output of comparator 226. Controller 143 converts the elapsed time to distance by means of a software timing loop in its operating program which checks for receipt of an echo every 75 microseconds. This interval represents the time required for sound to travel a 1 inch round trip distance at room temperature under normal environmental conditions.

Positioned in the center of the upper sonar transducer 116 is a light dependent resistor (LDR) 118. LDR 118 is coupled to a +V input voltage and to the noninverting input of an operational amplifier 123. The output of operational amplifier 123 is coupled back to its inverting input and is also provided to an analog-to-digital (A/D) converter 125. Grounded resistor 119 divides the voltage of the input provided to the noninverting pin of operational amplifier 123 to an appropriate value. The output of A/D converter 125 is provided to the master processor 150. Master processor 150 then correlates receipt of a predetermined light level received from a given angular direction, or bearing, as programmed in the master processor. The direction of the light source is then provided to the master processor 150 by controller 143 as it rotates the stepper motor 140. It is in this manner that the sonar ranging/light detection system 112 detects and stores the direction of a source, or sources, of received light of a predetermined intensity or is able to map the light levels in its environment.

The master processor 150 provides eight commands to controller 143 for controlling the operation of the sonar ranging/light detection system 112. The various bytes and associated functions utilized in generating these commands are shown in Table I.

TABLE I

| COMMAND | BYTE | FUNCTION |
|---|---|---|
| 1 | 111ddddd | Set counterclockwise bearing limit. |
|  | 110ccccc | Set clockwise bearing limit. |
|  | 101bhrrr | Set scan/rotate/pulse rate. Enabled sonars: b=base, h=head. |
| 2 | 100bbbbb | Get distance at bearing bbbbb for next READ. |
| 3 | 011ttttt | Select post-back-step delay in mS. (Defaults, if unspecified). |

TABLE I-continued

| COMMAND | BYTE | FUNCTION |
|---|---|---|
|  | 010sssss | Select pre-back-step delay in mS. (Defaults, if unspecified). |
| 4 | 001xxxxx | Get current bearing for next READ. |
| 5 | 000bbbbb | Go to bearing bbbbb. Sets ccccc=ddddd=bbbbb. |

These various commands are discussed briefly in the following paragraphs.

In executing command 1, if either ccccc or ddddd is set >10111 (binary), the upper sonar transducer 116 will rotate at a rate determined by rrr. In proceeding to a designated bearing (command 5), the limits ccccc and ddddd are set to the designated bearing. The lower sonar transducer 142 will pulse once per revolution (at 0°) of the upper sonar transducer 116 if enabled. The angular rate rrr is 111, which is the fastest angular rate of displacement, at power-up. If ccccc=ddddd<11000, the reflecting mirror 121 will first home to 0° (straight ahead) and then go to the designated bearing and stop. The upper and lower sonar transducers will alternately pulse at rate rrr. If ccccc is ≠ ddddd, reflecting mirror 121 will scan back and forth between the ccccc and ddddd limits. If ccccc or ddddd have not been specified since power-up, 00000 is used. The lower sonar transducer will pulse when each limit is reached, if enabled. If the reflecting mirror is manually displaced in its scanning mode, such as by external interference with its operation, reflecting mirror 121 will return to 0° if its current mode includes 0°, since controller 143 checks for the index in the slotted disc 136 whenever the reflecting mirror should be at 0°, and will correct itself if necessary.

Bearings are specified as the number of clockwise 15° steps from the straight-ahead direction (00000 direction) with respect to the rotating reflecting mirror 121. 10111 is therefore 345°. If bbbbb=11000 in the "get distance" operation of command 2, the lower sonar transducer 142 distance will be read from controller 143 by the master processor 150. Sonar distances are measured to the center of the head, except when the output of the lower sonar transducer 142 is read. This is because the rotating sonar is not centered on the head. The readings are therefore corrected to make measurements to the center of the head. If distance data=00, the data is invalid, e.g., requested bearing not scanned, motor slipped, object too close, etc. If distance data=FF (HEX), this indicates that no echo has been received, i.e., the object from which the sonar signal is reflected is greater than 10 feet 7½ inches from the sonar receiver.

In executing command 3, the default retro-torque damping constants sssss and ttttt are chosen based upon stepper motor 140 and reflecting mirror 121 parameters. The software operating program of controller 143 permits these damping constants to be changed in allowing for the use of different components in the sonar ranging/light detection system 112. Current to the stepper motor 140 is reduced by approximately 70% after each step which is the minimum current required to ensure that the stepper motor 140 will not slip due to bumps and vibrations while the robot is in motion.

The "get bearing" command (001xxxxx) is useful when using the light sensing capability of the sonar ranging/light detection system 112. When a particular light level is sensed during a scan or revolution of the rotating reflecting mirror 121, the master processor 150 may issue this command in order to permit it to read the bearing at which that light level was detected.

Unless the specified bearing is >10111, the "go to bearing" command (00bbbbb) does not home the upper sonar, but rather causes the rotating reflecting mirror 121 to proceed directly to the specified bearing through the smallest arc. If the specified bearing is >10111, the rotating reflecting mirror 121 will rotate at rate rrr, and limits ccccc and ddddd are set to 0.

The operation of controller 143 in controlling the operation of the sonar ranging/light detection system of the present invention will now be explained with reference to the flow charts shown in FIGS. 3, 4 and 5a and 5b. In these figures, an oval symbol indicates the start of an operational sequence, a rectangle indicates an instruction or set of instructions resulting in the performance of a control function, and a diamond indicates a decision point based upon the comparison of binary signals within controller 143.

Figure 3:
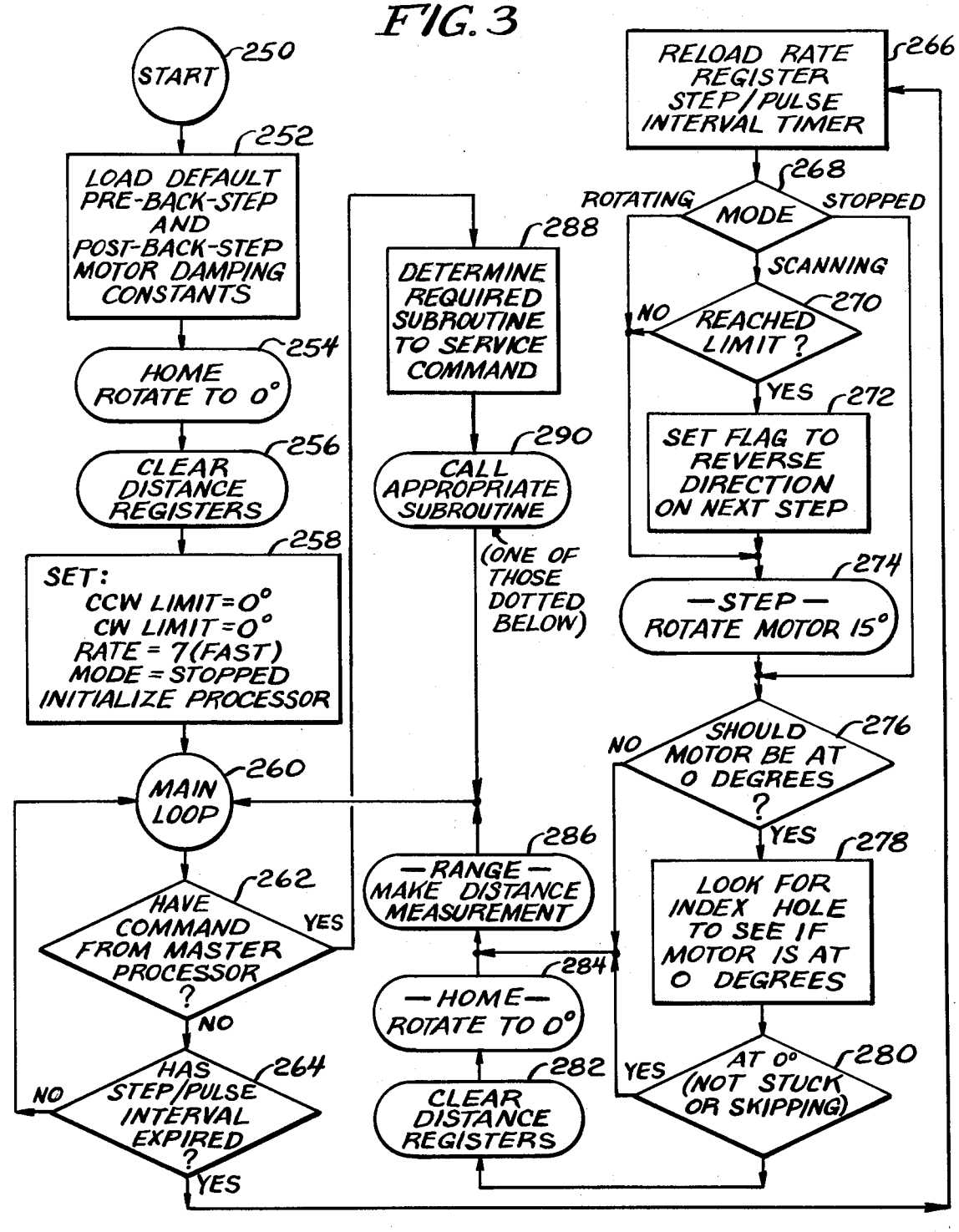
FIGS. 3, 4, 5a and 5b present flow charts illustrating the operation of a sonar ranging/light detection system under the control of a microcomputer in accordance with a preferred embodiment of the present invention.
Figure 3:
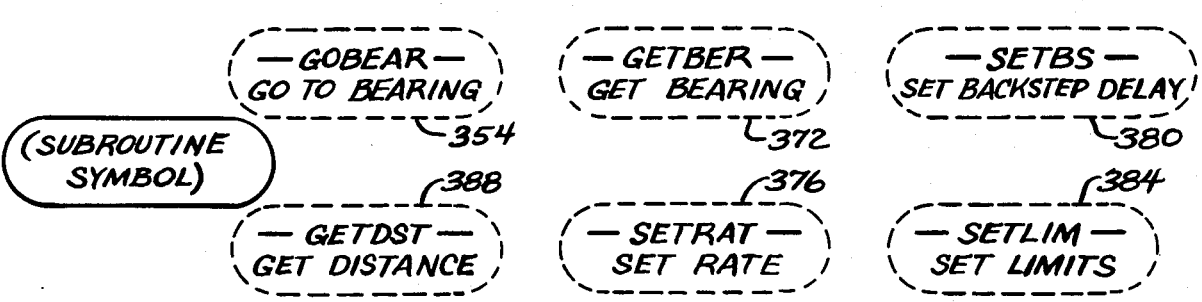

Referring to the lower portion of FIG. 3, the various subroutines corresponding to the commands discussed above are indicated. Execution of these subroutines in the sonar ranging/light detection system is discussed below with respect to FIGS. 5a and 5b. As shown in FIG. 3, initiation of the main loop of the operating program in controller 143 occurs at step 250. The operating program then loads default stepper motor damping constants for execution of the retro-torque control function of stepper motor 140. These damping constants are determined by various system parameters such as the mass and inertia of the stepper motor 140, the mass of rotating support shaft 130, and the size of the slotted disc 136. These constants may be changed in order to accommodate components of various sizes by appropriate commands from the master processor 150.

The operating program then rotates to a 0° bearing (straight ahead) at step 254 and clears the distance registers in controller 143 at step 256. There are twenty-four distance registers, one for each of the twenty-three 15° increments of the rotating reflecting mirror and one distance register for the lower sonar transducer 142. The operating program then sets the clockwise and counterclockwise bearing limits to 0°, the pulse/step rate to the fastest value, the mode to a "stopped" state, and initializes controller 143. The operating program then enters the main loop at step 260 and initially determines whether a command has been received from the master processor at step 262. If a command has not yet been received by controller 143 from the master processor 150, the program then determines whether a step/pulse interval has expired at step 264. If this interval has not yet expired indicating that another pulse should not yet be emitted or that the rotating mirror should not be rotationally incremented, the program returns to step 260 where the main loop is entered again. If at step 262 it is determined that a command has been received from the master processor 150, the program then determines at step 288 which of the subroutines shown at the right in FIG. 3 should be called to service the command. The operating program then calls up the appropriate subroutine at step 290, executes this subroutine, and then returns to step 260 for entering the main loop of the operating program again.

If at step 264, the operating program determines that the step/pulse interval has expired, it next reloads the rate register, i.e., the step/pulse interval timer, at step 266 and determines the current mode of operation at step 268.

If the system is in the rotating mode of operation, the program branches from step 268 to step 274 where the stepper motor is rotated clockwise in a 15° increment. If at step 268 it is determined that the system is in the stopped mode, the operating program branches down to step 276 and determines if the stepper motor should be positioned at 0°. If at step 268 it is determined that the system is in the scanning mode of operation, the operating program next determines whether a scanning limit has been reached at step 270 and either rotates the motor in a 15° increment at step 274 if a limit has not yet been reached, or sets a flag to reverse the direction of rotation on the next step at step 272 if a scanning limit has been reached.

Regardless of the mode of operation detected at step 268, the operating program eventually arrives at step 276 where it determines if the stepper motor should be oriented at 0°. If at step 276, the operating program determines that the stepper motor should not be positioned at 0°, the program branches to step 286 where a range, or distance, measurement is made as described below with respect to FIG. 4. If at step 276, the program determines that the stepper motor should be positioned at 0°, the program then determines if the index aperture in the slotted disc 136 is positioned at 0° at step 278. If at step 280 it is determined that the index aperture is positioned at 0°, the program then branches to step 286 where a range measurement is made. If at step 280 it is determined that the stepper motor is not positioned at 0°, the program clears all of the distance registers within controller 143 of possibly erroneous data at step 282 and then executes a clockwise rotation of the stepper motor to 0° at step 284. A range measurement is then made at step 286 and the program returns to the start of the main loop of the operating program at step 260.

Figure 4:
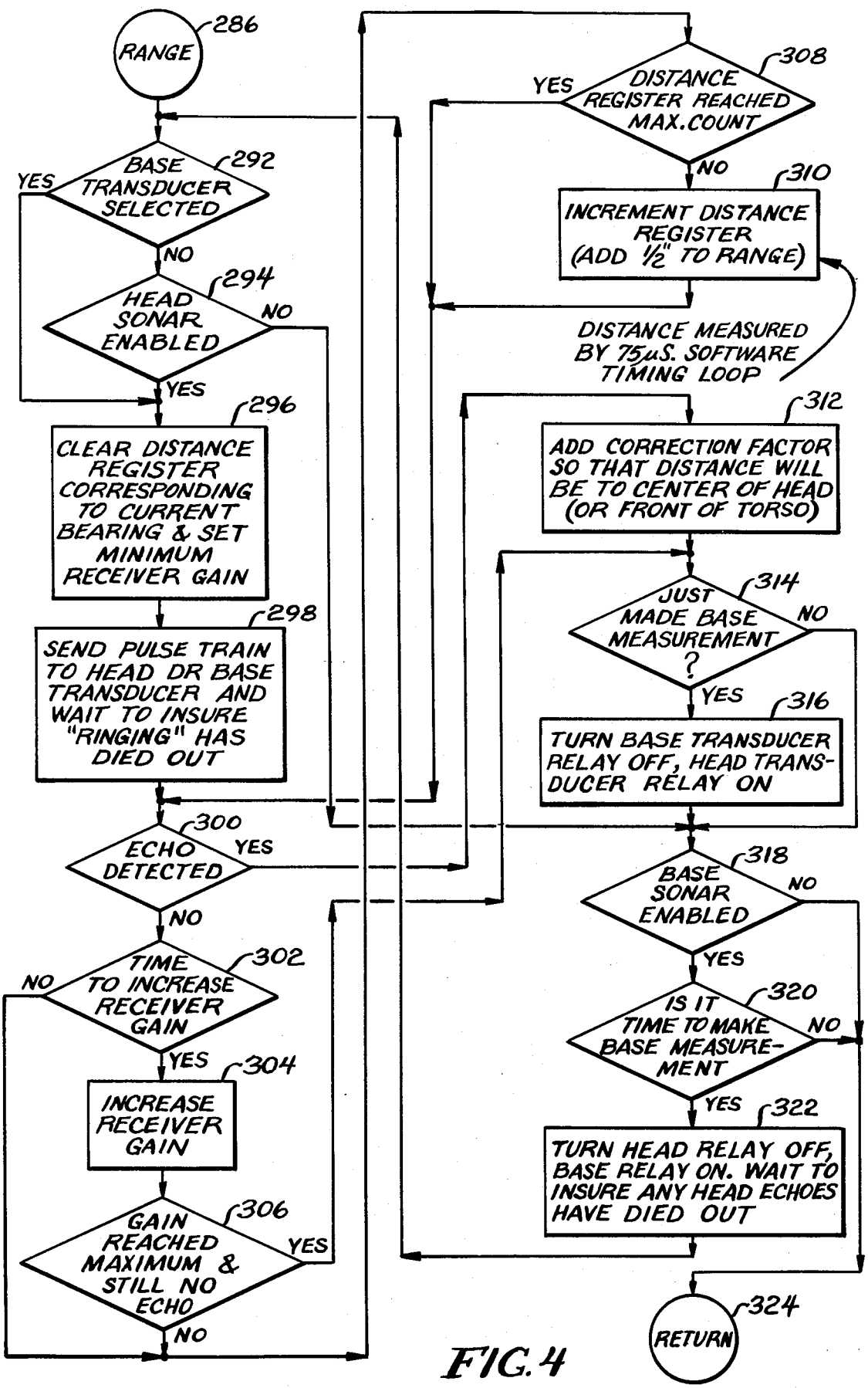

Referring to FIG. 4, there is shown the steps involved in making a distance, or range, measurement in the sonar ranging/light detection system. The range measurement subroutine is entered at step 286 and the operating program initially determines if the base, or lower, sonar transducer 142 is selected at step 292. If it is selected, the program branches to step 296 and clears the distance register corresponding to the current bearing and sets the receiver circuit 220 to minimum gain. If at step 292 it is determined that the base transducer is not selected, the program then determines if the upper sonar transducer 116 is enabled at step 294 and, if enabled, then proceeds to step 296. After the distance register corresponding to the current bearing is cleared and receiver gain is set to the minimum value, controller 143 then provides a series of pulses to either the upper or lower sonar transducer 116, 142 and waits for all "ringing" in the circuit to dissipate. The system then begins looking for an echo at step 300 and if an echo is not detected, then determines whether it is time to increase receiver gain at step 302. If it is not yet time to increase receiver gain, the program then branches to step 308 and determines whether the distance register has reached a maximum count. If it is determined at step 302 that it is time to increase receiver gain, the gain is incrementally increased at step 304 until maximum receiver gain is realized and an echo still has not yet been received at step 306. If an echo has not yet been received the program branches to step 314 and determines whether a lower sonar transducer distance measurement has been made. If maximum receiver gain has been reached and still no echo has been received, the program branches to step 308 and determines whether the distance register has reached a maximum count. If it has reached a maximum count, the program then branches to step 300 and again looks to see if an echo has been detected. If the maximum count of the distance register has not yet been reached as determined at step 308, the program then increments the distance register at step 310 and again looks to see if an echo has been received at step 300.

If an echo is not detected at step 300, the program again proceeds to step 302 to determine if it is time to increase receiver gain. If it is determined at step 300 that an echo has been received, the program branches to step 312 and adds a correction factor so that the measured distance will be either to the center of the head or to the lower sonar transducer 142. The program then proceeds to step 314 where it determines if a base measurement has just been made. If a base measurement has been made the controller 143 turns off the lower transducer relay 194 and actuates the upper transducer relay 192. The program then determines if the lower sonar transducer 142 is enabled at step 318. Similarly, if at step 314 it is determined that a lower sonar transducer measurement has not been made, the program proceeds to step 318 and determines if the lower sonar transducer 142 is enabled. If the lower sonar transducer is not enabled, the program returns to the main loop of the operating program shown in FIG. 3 at step 324. If at step 318 it is determined that the lower sonar transducer is enabled, the program then determines if it is time to make a base measurement from the lower sonar transducer at step 320. If it is not yet time to make a base measurement, the program branches to step 324 and returns to the main loop of the operating program. If at step 320 it is determined that it is time to make a base sonar measurement, the program proceeds to step 322 and deactivates the upper sonar transducer relay 192 and activates the lower sonar transducer relay 194. The program then waits to ensure that any echoes from the upper sonar transducer 116 have disappeared and returns to step 292 in order to determine which of the upper and lower sonar transducers is selected in order to make a distance, or range, measurement.

Figure 5A:
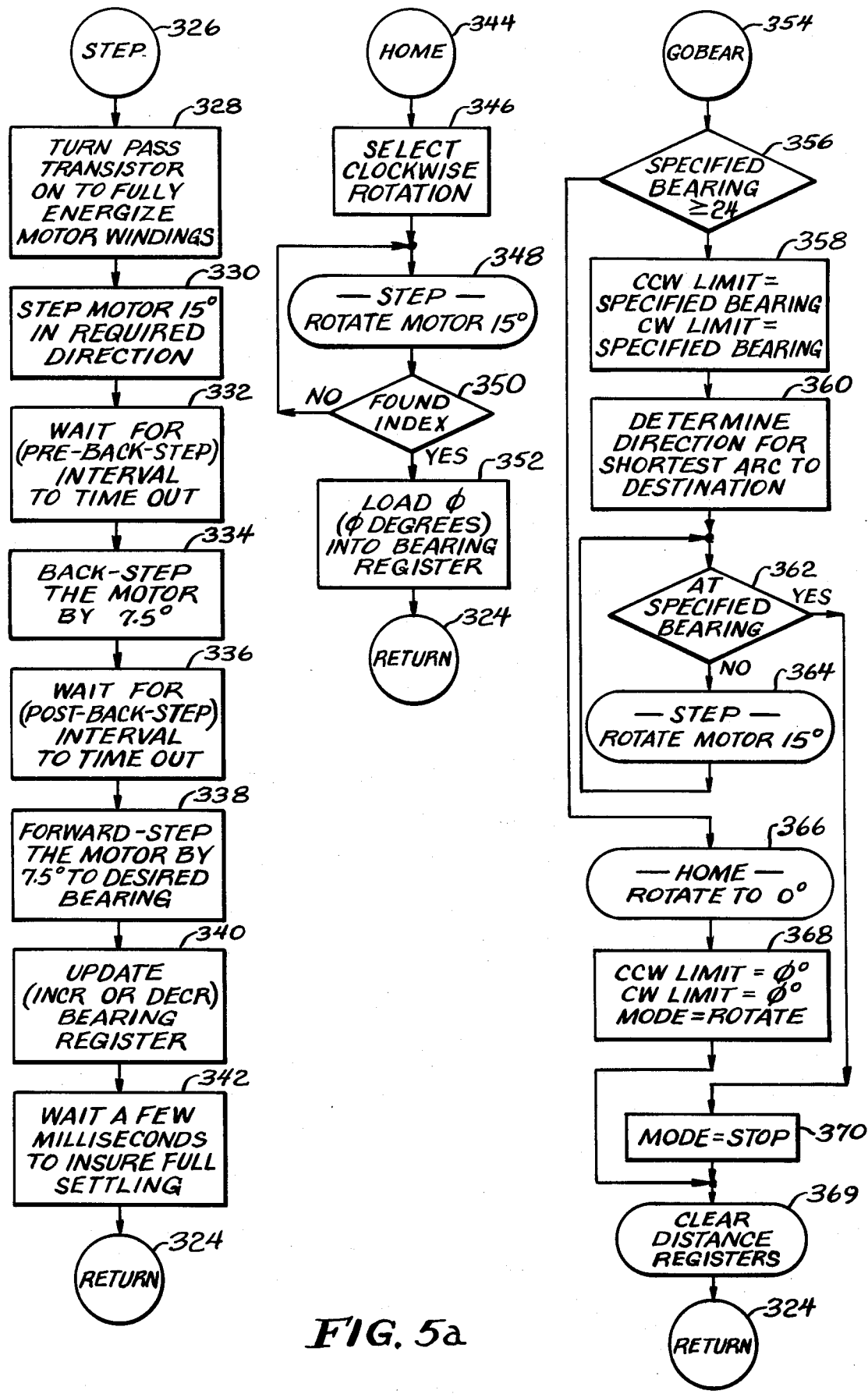
Figure 5B:
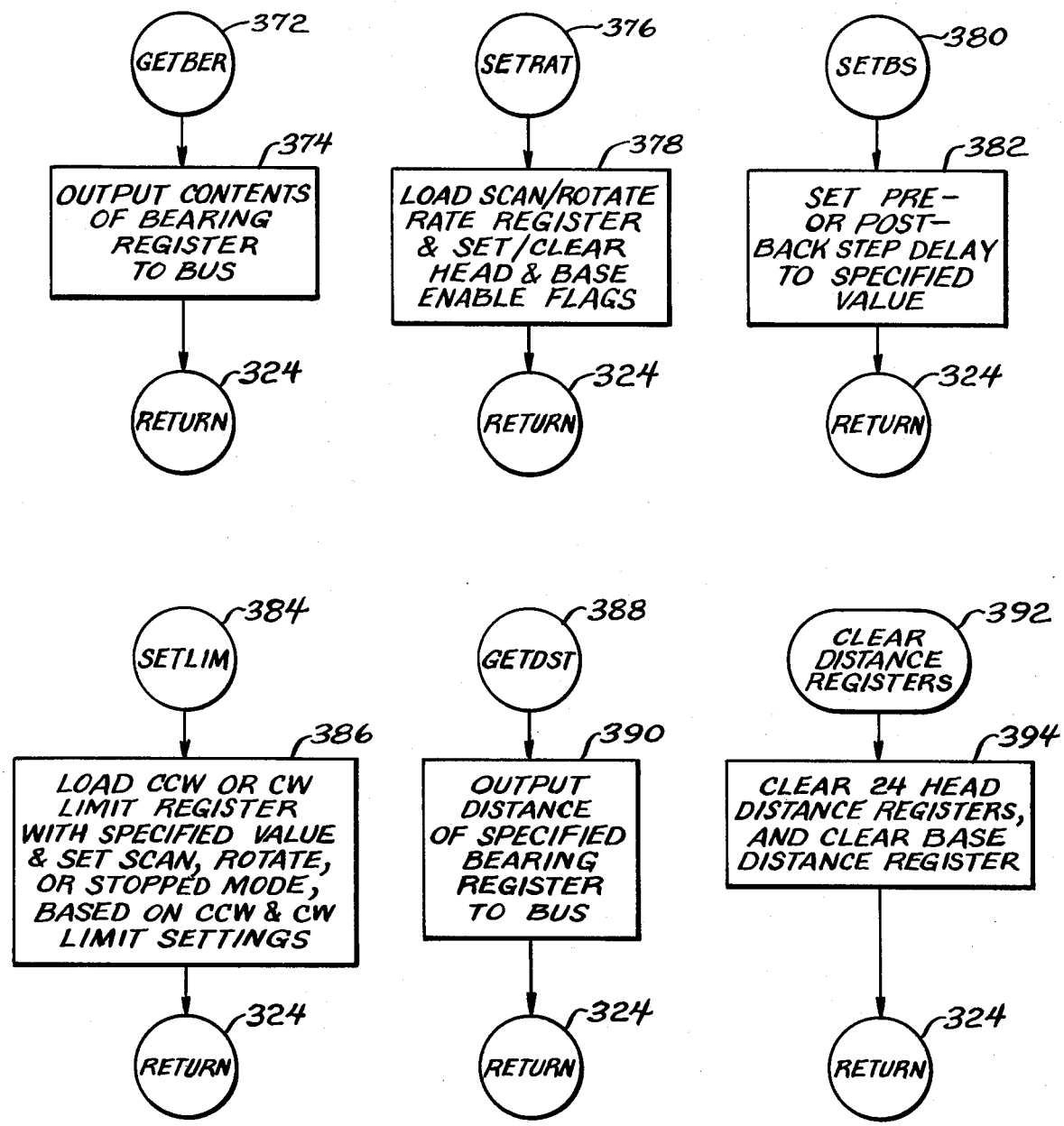

Shown in FIGS. 5a and 5b are various subroutines executed in the main loop of the operating program. In proceeding from left to right, the first shown is a "stepping" routine which begins at step 326 for rotationally displacing the stepper motor in 15° increments. After the stepper motor routine is entered at step 326, the program then causes controller 142 to turn on PNP transistor 168 for energizing the windings of stepper motor 140 at step 328. At step 330 the stepper motor is displaced 15° in the required direction which is followed by a pre-back-step interval timing out at step 332. The stepper motor is then back-stepped by 7.5° at step 334, where the program then permits a post-back-step interval to time out at step 336. The motor is then stepped in a forward direction by 7.5° to the desired bearing at step 338 and the bearing register in controller 143 is updated at step 340. Transistor 168 is then deenergized after waiting for a few milliseconds to ensure complete settling of the stepper motor 140 at step 342 and the program returns at step 324 to the main loop of the operating program. The duration of the various timing intervals in the stepper motor rotation routine are determined by various parameters of the stepper motor/rotating shaft/reflecting mirror combination and may be programmed by the master processor 150 to accommodate a unique drive system arrangement.

The "home" subroutine is initiated at step 344 in order to rotate the reflecting mirror 121 to 0°, or straight ahead. In this subroutine, clockwise rotation of the reflecting mirror is initiated at step 346 and the mirror is rotated in 15° increments at step 348 until the slotted index in disc 136 is detected at step 350. Once the slot in the disc is detected, 0° is loaded into the bearing register in controller 143 at step 352 and the program returns to the main loop of the operating program at step 324.

The "go to bearing" subroutine is initiated at step 354 and the program initially determines whether the specified bearing is ≧24, which corresponds to 0° bearing, or straight ahead. If the specified bearing is ≧24, the program rotates the reflecting mirror 121 to 0° at step 366. If the specified bearing is <24, the program then sets both the clockwise and counterclockwise limits to the specified bearing at step 358, determines the direction of the shortest arc to the specified bearing at step 360, and then determines if the reflecting mirror is at the specified bearing at step 362. If the reflecting mirror is at the specified bearing, the program then branches to step 370 and enters a rotation stop mode of operation. If at step 362 it is determined that the reflecting mirror is not at the specified bearing, the program begins rotating the stepping motor in 15° increments at step 364 in a closed loop operation until the reflecting mirror is directed to the specified bearing whereupon the program branches to step 370 for stopping the rotation of the stepper motor.

If at step 356 the specified bearing is determined to be ≧24 and the program branches to step 366 in rotating the reflecting mirror to 0°, the clockwise and counterclockwise limits are set at 0°, and the rotate mode of operation is initiated at step 368. The distance registers in controller 143 are cleared at step 369 and the program returns to the main loop of the operating program at step 324.

The "get bearing" routine is initiated at step 372 and involves providing the contents of the bearing register to the data bus 152 for delivery to the master processor 150. The "get bearing" subroutine then executes a return to the main loop of the operating program at step 324. The "set rate" subroutine is initiated at step 376 and involves the loading of the scan/rotate rate register in controller 143 with appropriate data and setting and/or clearing the upper and lower sonar transducer enable flags in controller 143. The program then returns to the main loop of the operating program at step 324.

The "set-back step delay" subroutine is initiated at step 380 and involves setting the pre- or post-back-step delay to a predetermined value at step 382 and then returning to the main loop of the operating program at step 324. The "set limits" subroutine is initiated at step 384 and involves loading the counterclockwise or clockwise limit register with a predetermined value and setting the scan, rotate, or stop mode based upon the counterclockwise and clockwise limit settings at step 386. The "get distance" subroutine is initiated at step 388 and involves outputting the distance of a specified bearing register to the data bus 152 and thence to the master processor 150 at step 390. The clear distance registers subroutine is initiated at step 392 and involves clearing the twenty-four upper sonar transducer distance registers and the lower sonar transducer register at step 394.

There has thus been shown a sonar ranging/light detection system for use in a mobile robot which not only provides 360° sonar ranging coverage, but also provides an omnidirectional light level detection capability. The system also includes a second, stationary sonar sensor from which accurate range information along the path of robot motion may be derived. The 360° sensor includes a rotating reflecting mirror which may be used in various modes of operation.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use in a robot, a sensor system comprising:
   a first acoustic transducer for transmitting and receiving acoustic signals;
   a light detector responsive to a light signal incident thereon;
   a rotating reflector rotatable through 360° and positioned adjacent said first acoustic transducer and said light detector for directing the acoustic signals transmitted by the transducer outward from said robot and for directing light signals and acoustic signal echoes incident on said reflector to said light detector and to said first acoustic transducer, respectively;
   rotation sensing means coupled to said rotating reflector for determining the angular position thereof;
   a controller coupled to said rotating reflector and to said sensing means for controlling the angular position of said reflector; and
   a second fixed acoustic transducer positioned on a forward portion of the robot and coupled to said controller for transmitting and receiving acoustic signals.

2. A robot sensor system in accordance with claim 1 further including oscillating means coupled to said controller and to said first transducer for providing an acoustic frequency signal thereto in response to receipt of a control signal from said controller.

3. A robot sensor system in accordance with claim 2 wherein said oscillating means includes variable frequency oscillating means responsive to said control signal for sequentially providing a plurality of acoustic signals to said first transducer, wherein all of said acoustic signals have a different frequency.

4. A robot sensor system in accordance with claim 3 wherein said variable frequency oscillating means includes an astable multivibrator.

5. A robot sensor system in accordance with claim 3 wherein four acoustic signals are provided to said first transducer, with each of said four acoustic signals having a different frequency.

6. A robot sensor system in accordance with claim 1 further including a stepping motor coupled to said controller and to said reflector for incrementally rotating said reflector in accordance with drive control signals from said controller.

7. A robot sensor system in accordance with claim 6 further including damping means coupled to said stepping motor for more accurately positioning said reflector during the incremental rotation thereof.

8. A robot sensor system in accordance with claim 1 wherein said rotation sensing means includes a slotted disc coupled to said rotating reflector in combination with an optical detector coupled to said controller for providing rotating reflector bearing position information thereto.

9. A robot sensor system in accordance with claim 8 wherein said optical detector includes an optically coupled combination of a light emitting diode and a phototransistor.

10. A robot sensor system in accordance with claim 1 further including receiver means coupled between said first transducer and said controller for processing and providing said received acoustic signals to said controller.

11. A robot sensor system in accordance with claim 10 further including variable gain control means coupled between said controller and said receiver means responsive to gain control signals from said controller for varying the gain of said receiver means.

12. A robot sensor system in accordance with claim 11 wherein the gain of said receiver means is incrementally increased with time by said gain control signals following the transmission of an aboustic signal.

13. A robot sensor system in accordance with claim 1 further including an acoustic signal generating oscillator and an acoustic signal receiver coupled to said controller and to said first transducer for providing transmitted signals thereto and for processing received acoustic signal echoes therefrom, respectively.

14. A robot sensor system in accordance with claim 13 further including transformer means coupling said oscillator and said receiver to the first transducer for isolating the transmitted and received signals.

15. A robot sensor system in accordance with claim 1 further including switch means coupling said first and second transducers to said controller.

16. A robot sensor system in accordance with claim 15 wherein said switch means comprises first and second switch means each including a transistor and a relay in combination for alternately coupling said first and second transducers to said controller.

17. A robot sensor system in accordance with claim 1 wherein said first acoustic transducer is located in an upper portion of said robot and said second acoustic transducer is located in a lower, forward portion of said robot.

18. A robot sensor system in accordance with claim 1 wherein said light detector is coupled to said controller for providing bearing information for a source of received light thereto.

19. A robot sensor system in accordance with claim 18 wherein said controller includes memory means for storing said bearing information during one revolution of said rotating reflector.

20. A robot sensor system in accordance with claim 1 wherein said light detector includes a light dependent resistor.

21. For use in a robot, a sensor system comprising:
   a first acoustic transducer for transmitting and receiving acoustic signals;

a rotating reflector rotatable through 360° and positioned adjacent said acoustic transducer for directing the acoustic signals transmitted by the transducer outward from said robot and for directing acoustic signal echoes to said acoustic transducer;

light detecting means positioned on said acoustic transducer and responsive to light incident upon and reflected by said rotating reflector;

rotation sensing means coupled to said rotating reflector for determining the angular position thereof;

a controller coupled to said rotating reflector and to said sensing means for controlling the angular position of said reflector; and a second fixed acoustic transducer positioned on a forward portion of the robot for transmitting and receiving acoustic signals in detecting an object in front of the robot.

22. A robot sensor system in accordance with claim 21 further comprising a stepping motor coupled to said controller and to said reflector for incrementally rotating said reflector in accordance with drive signals from said controller.

23. A robot sensor system in accordance with claim 22 further comprising damping means coupled to said stepping motor for more accurately positioning said reflector during the incremental rotation thereof.

24. A robot sensor system in accordance with claim 21 wherein said rotation sensing means includes a slotted disc coupled to said rotating reflector in combination with an optical detector coupled to said controller for providing rotating reflector bearing position information thereto.

25. A robot sensor system in accordance with claim 24 wherein said optical detector includes an optically coupled combination of a light emitting diode and a phototransistor.

26. A robot sensor system in accordance with claim 21 wherein said light detecting means is coupled to said controller for providing bearing information for a source of received light thereto.

* * * * *